US012771421B2

(12) United States Patent
Wang

(10) Patent No.: US 12,771,421 B2
(45) Date of Patent: Oct. 20, 2026

(54) REPORTING METHOD, EQUIPMENT, AND MEDIUM

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 215 days.

(21) Appl. No.: 18/559,862

(22) PCT Filed: May 10, 2022

(86) PCT No.: PCT/CN2022/092006

§ 371 (c)(1),
(2) Date: Nov. 9, 2023

(87) PCT Pub. No.: WO2022/237788

PCT Pub. Date: Nov. 17, 2022

(65) Prior Publication Data

US 2024/0250730 A1 Jul. 25, 2024

(30) Foreign Application Priority Data

May 10, 2021 (CN) ........................ 202110507813.X

(51) Int. Cl.

*H04B 7/06* (2006.01)
*H04B 17/318* (2015.01)
*H04B 17/336* (2015.01)

(52) U.S. Cl.

CPC ......... *H04B 7/0626* (2013.01); *H04B 17/328* (2023.05); *H04B 17/336* (2015.01)

(58) Field of Classification Search

CPC ... H04B 7/0626; H04B 17/336; H04B 17/328
See application file for complete search history.

(56) References Cited

U.S. PATENT DOCUMENTS

2020/0112966 A1 4/2020 Liu
2020/0220631 A1 7/2020 Onggosanusi et al.
(Continued)

FOREIGN PATENT DOCUMENTS

CN 108933648 A 12/2018
CN 109302272 A 2/2019
(Continued)

OTHER PUBLICATIONS

NTT Docomo, Inc "Discussion on beam management for MTRP" 3GPP TSG RAN WG1 #103-e R1-2009177, dated Oct. 26-Nov. 13, 2020.

(Continued)

*Primary Examiner* — Ronald B Abelson
(74) *Attorney, Agent, or Firm* — JCIPRNET

(57) ABSTRACT

A reporting method, an equipment, and a medium are provided in the disclosure. The method includes: receiving network configuration information, where the network configuration information includes channel state information (CSI) report configuration information; obtaining a CSI report according to the CSI report configuration information; and reporting the CSI report according to the network configuration information, where the CSI report includes measurement results for one or more beam pairs/groups.

17 Claims, 3 Drawing Sheets

(56) References Cited

U.S. PATENT DOCUMENTS

| | | | |
|---|---|---|---|
| 2021/0022130 A1 | 1/2021 | Gao et al. | |
| 2021/0076241 A1 | 3/2021 | Yang et al. | |
| 2021/0194558 A1* | 6/2021 | Venugopal | H04L 25/0228 |
| 2023/0071430 A1* | 3/2023 | Matsumura | H04L 5/0057 |
| 2023/0148159 A1* | 5/2023 | Zhang | H04L 5/0094 |

FOREIGN PATENT DOCUMENTS

| | | | |
|---|---|---|---|
| CN | 109392001 | | 2/2019 |
| CN | 110381531 | | 10/2019 |
| CN | 110622459 | | 12/2019 |
| CN | 110958636 | | 4/2020 |
| CN | 111294850 | | 6/2020 |
| CN | 112312455 | | 2/2021 |
| CN | 112753188 | | 5/2021 |
| CN | 113923709 | A | 1/2022 |
| WO | WO 2019221542 | * | 11/2019 |
| WO | 2021205667 | A1 | 10/2021 |

OTHER PUBLICATIONS

Notice of Reasons for Refusal issued in corresponding JP application No. 2023-569618 dated Nov. 26, 2024.

Samsung, 3GPP TSG RAN WG1 96bis, R1-1904450, Enhancements on multi-beam operations, Apr. 16, 2019. sections 1-6.

WIPO, International Search Report and Written Opinion for International Application No. PCT/CN2022/092006, Jul. 27, 2022.

"Decision on Rejection of China Counterpart Application", with English translation thereof, issued on Aug. 2, 2025, pp. 1-12.

"Office Action of China Counterpart Application", with English translation thereof, issued on Feb. 12, 2026, pp. 1-12.

"Notice on Grant of Patent Right for Invention of China Counterpart Application", issued on Apr. 16, 2026, pp. 1-10.

* cited by examiner

REPORTING METHOD, EQUIPMENT, AND MEDIUM

CROSS-REFERENCE TO RELATED APPLICATION(S)

This application is a National Stage of International Application No. PCT/CN2022/092006, field on May 10, 2022, which claims priority to Chinese Patent Application No. 202110507813.X, filed on May 10, 2021, both of which are incorporated by reference herein.

TECHNICAL FIELD

This disclosure relates to the field of communication technology, in particular to a reporting method, an equipment, and a medium.

BACKGROUND

Channel state information (CSI) is a channel attribute of a wireless communication link. It describes a fading factor of a signal in each transmission path, that is, a value of each element in a channel gain matrix H, such as signal scattering, multi-path fading or shadowing fading, power decay of distance, and other information.

The 3rd generation partnership project (3GPP) new radio (NR) R15/R16 protocol supports beam measurement and reporting, where the beam is characterized by a reference signal. For non-beam group-based beam measurement and CSI report, the CSI report may include one or more reference signal indexes and corresponding measurement results L1-reference signal received power (RSRP) values or L1-signal-to-interference-plus-noise ratio (SINR) values. R15/R16 protocol also supports beam group-based CSI measurement and reporting, but one CSI report only contains one beam group, and one CSI only associates with one resource set.

In R17, beam enhancement in multi-transmission and reception point (TRP) scenarios is standardizing to further optimize and improve the beam management mechanism. However, there is no specific technical scheme for the specific content of the CSI report.

SUMMARY

In a first aspect, embodiments of the disclosure provide a reporting method. The reporting method includes: receiving network configuration information, where the network configuration information includes channel state information (CSI) report configuration information: obtaining a CSI report according to the CSI report configuration information: and reporting the CSI report according to the network configuration information, where the CSI report includes measurement results for one or more beam pairs/groups.

In a second aspect, embodiments of the disclosure provide a communication equipment. The communication equipment includes a transceiver, a memory storing program instructions, and a processor. The processor is coupled with the memory and the transceiver and is configured to invoke the program instructions to: cause the transceiver to receive network configuration information, where the network configuration information includes CSI report configuration information: obtain a CSI report according to the CSI report configuration information: and cause the transceiver to report the CSI report according to the network configuration information, where the CSI report includes measurement results for one or more beam pairs/groups.

In a third aspect, embodiments of the disclosure provide a non-transitory computer-readable storage medium. The computer-readable storage medium stores one or more instructions. The one or more instructions are adapted to be loaded by a processor and to perform the reporting method of the first aspect.

BRIEF DESCRIPTION OF THE DRAWINGS

To more clearly explain the technical solutions of embodiments of the disclosure, the drawings required to be used in the description of the embodiments will be briefly introduced below. It will be obvious that the drawings described below are some embodiments of the disclosure, and other drawings can be obtained from these drawings without creative effort for those of ordinary skill in the art.

DETAILED DESCRIPTION

Figure 1:
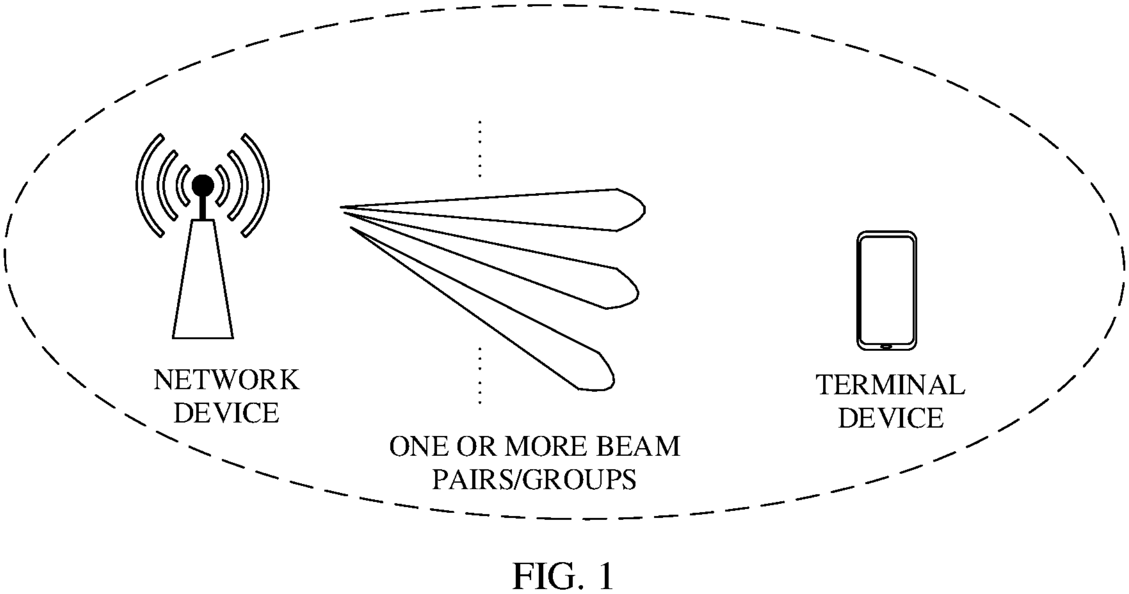
FIG. 1 is a schematic diagram of a communication network architecture provided in embodiments of the disclosure.

Exemplary embodiments, examples of which are shown in the drawings, will be explained in detail herein. When the following description relates to the drawings, the same numerals in different drawings denote the same or similar elements unless otherwise indicated. The embodiments described in the following exemplary implementations are not representative of all implementations consistent with the disclosure. Rather, they are only examples of devices and methods consistent with some aspects of the disclosure as detailed in the appended claims.

It should be noted that, as used herein, the terms "include," "contain," or any other variation thereof are intended to encompass non-exclusive inclusion, such that a process, method, article, or device including a set of elements includes not only those elements but also other elements not explicitly listed, or also elements inherent to such a process, method, article, or device. Without further limitation, an element defined by the phrase "including an . . . " does not preclude the existence of another identical element in the process, method, article, or device in which the element is included. Furthermore, components, features, elements having the same name in different embodiments of the disclosure may have the same meaning or different meanings, the specific meanings of which are to be determined by their interpretation in the specific embodiment or further in conjunction with the context in the specific embodiment.

It should be understood that although the terms "first", "second", "third", etc. may be used herein to describe various kinds of information, such information should not be limited to these terms. These terms are only used to distinguish the same type of information from each other. For example, without departing from the scope herein, the first information may also be referred to as the second information and similarly the second information may also be referred to as the first information. Depending on the context, the word “if” as used herein can be interpreted as “when” or “while” or “in response to determining”. Furthermore, as used herein, the singular forms “a”, “an”, and “the” are intended to include plural forms as well, unless the context dictates to the contrary. It should be further understood that the terms “including” and “containing” indicate the existence of the described features, steps, operations, elements, assemblies, items, categories, and/or groups, but do not exclude the existence, occurrence, or addition of one or more other features, steps, operations, elements, assemblies, items, categories, and/or groups. The terms “or” and “and/or” as used herein are construed as inclusive or mean any one or any combination. Thus, “A, B, or C” or “A, B, and/or C” means “any of the following: A: B: C: A and B: A and C: B and C: A. B, and C”. Exceptions to this definition occur only when combinations of elements, functions, steps, or operations are inherently mutually exclusive in some way.

It should be understood that although the various steps in the flow chart in the embodiments of the disclosure are shown sequentially as indicated by the arrows, these steps are not necessarily performed sequentially in the order indicated by the arrows. Unless expressly stated herein, the execution of these steps is not strictly sequential and may be performed in other orders. Furthermore, at least a portion of the steps in the figure may include multiple sub-steps or stages, which are not necessarily completed at the same time, but may be executed at different times, and the execution order is not necessarily sequential, but may be executed in turn or alternately with other steps or at least a portion of sub-steps or stages of other steps.

It should be noted that, herein, marks of steps such as 110 and 120 are adopted, which are intended to express the corresponding contents more clearly and briefly, and do not constitute a substantial limitation in order. In the specific implementation, those skilled in the art may perform 120 first and then 110, and these should be within the scope of protection of the disclosure.

In the subsequent description, suffixes such as “module”, “component”, or “unit” used to denote elements are used only for the benefit of the description of the disclosure and have no specific meaning per se. Therefore, “module”, “component”, or “unit” can be used in a mixed way.

To better understand embodiments of the disclosure, the following description is given to the technical terms or technical information related to the embodiments of the disclosure.

Transmission and reception point (TRP). A cell can be composed of one TRP or multiple TRPs. The TRP herein is a logical concept. One TRP can be a physical network station, such as remote radio head (RRH) and base station, or one TRP can be composed of multiple physical network stations.

A channel state information (CSI) report is generated by a terminal device. The terminal device can measure one or more reference signals (RS) to obtain the CSI report. In the disclosure, one CSI report may include measurement results for one or more beam pairs/groups, and each beam pair/group may include two beams, i.e., each beam pair/group may include two reference signals. Furthermore, one CSI report can be associated with one or more resource sets or resource subsets. The resource set or resource subset may be resources of reference signals for measurement configured by a network device. In the disclosure, in the resource set or the resource subset, resources can be numbered independently. The reference signal can be a channel state information reference signal (CSI-RS) or a synchronization signal block (SSB).

Beam pair/group. In the disclosure, one beam pair may include two beams, and one beam group may also include two beams. The solution of the disclosure is not limited to the beam pair and the beam group, and they can be regarded as one concept, that is, beam pair/group. The terminal device can simultaneously receive different beams included in one beam pair/group. In embodiments of the disclosure, one beam may be characterized (or represented) by one RS, where the RS is one resource or signal, and the resource or signal that characterizes the beam can be from a resource set or a resource subset. One beam pair/group can be characterized by two RS, and the resources or signals that characterize the two beams of the beam pair/group can be from different resource sets or resource subsets.

To better understand the embodiments of the disclosure, a network architecture to which the embodiments of the disclosure may be applied is described below.

Referring to FIG. 1, FIG. 1 is a schematic diagram of a communication network architecture provided in embodiments of the disclosure. As shown in FIG. 1, the network architecture includes a network device and a terminal device. The network device herein may include a TRP and the number of network devices may be one or more, which is not limited in embodiments of the disclosure. The network device may transmit one or more beam pairs/groups and, accordingly, the terminal device may receive the one or more beam pairs/groups. The terminal device can detect the RS corresponding to each beam in the one or more beam pairs/groups, to obtain the corresponding CSI report.

It should be noted that the technical scheme of the disclosure can be applicable to the 5th generation (5G) communication system, 4th generation (4G) and 3rd generation (3G) communication systems, and various new communication systems in the future, such as 6th generation (6G), 7th generation (7G) and in-vehicle short-distance communication systems. The technical scheme of the disclosure is also applicable to different network architectures, including but not limited to relay network architectures, double-link architectures, vehicle-to-everything architectures, in-vehicle short-distance communication architectures, and the like.

The core network in the embodiments of the disclosure may be an evolved packet core (EPC), a 5G core network, or a new core network in a future communication system. The 5G core network include a group of devices, such as an access and mobility management function (AMF) achieving mobility management functions, a user plane function (UPF) providing packet routing and quality of service (QOS) management functions, a session management function (SMF) providing session management and IP address allocation and management functions, etc. EPC can be composed of MME which provides mobility management and gateway selection, Serving Gateway (S-GW) which provides data packet forwarding and PDN Gateway (P-GW) which provides terminal address allocation and rate control.

The network device in the embodiments of the disclosure is an entity used for transmitting or receiving signals on the network side, and can be used for mutually converting received over-the-air frames and Internet protocol (IP) packets, as a router between the terminal device and the rest of the access network, where the rest of the access network can include IP networks and the like. The network access device can also coordinate attribute management of an air interface.

For example, the network access device may be an eNB in LTE, a new radio controller (NR controller), a gNB in a 5G system, a centralized unit, a new wireless base station, a remote radio module, a micro base station, a relay, a distributed unit, a transmission and reception point (TRP) or a transmission point (TP), a G node in an in-vehicle short-range communication system, or any other wireless access device, but embodiments of the disclosure are not limited thereto.

The base station (BS) in the embodiments of the disclosure, also referred to as a base station device, is an apparatus deployed in a radio access network (RAN) to provide a wireless communication function. For example, devices providing the base station function in 2G network include a base transceiver station (BTS), devices providing the base station function in 3G network include Node B (Node B), devices providing the base station function in 4G network include evolved Node B (eNB), devices providing the base station function in wireless local area networks (WLAN) are access points (AP), devices providing the base station function in 5G new radio (NR) include gNB and ng-eNB. gNB and the terminal communicate with the NR technology, ng-eNB and the terminal communicate with the evolved universal terrestrial radio access (E-UTRA) technology, and gNB and ng-eNB can be connected to the 5G core network. The base station in the embodiments of the disclosure also includes devices for providing the base station function in future new communication systems and the like.

The base station controller in the embodiments of the disclosure is a device for managing the base station, such as a base station controller (BSC) in 2G network, a radio network controller (RNC) in 3G network, and a device for controlling and managing the base station in a future new communication system.

The network in the embodiments of the disclosure refers to a communication network providing communication services for the terminal, which includes a base station of the radio access network, a base station controller of the radio access network, and an equipment on the core network side.

The terminal in the embodiments of the disclosure may refer to various forms of user equipment (UE), access terminal, user unit, user station, mobile radio station, mobile station (MS), remote station, remote terminal, mobile equipment, user terminal, terminal device, wireless communication equipment, user agent or user device. The terminal device may also be a cellular telephone, a cordless telephone, a session initiation protocol (SIP) telephone, a wireless local loop (WLL) station, a personal digital assistant (PDA), a handheld device or a computing device with a wireless communication function, or other processing device connected to a wireless modem, a vehicle-mounted device, a wearable device, a terminal device in a future 5G network, or a terminal device in a future evolved public land mobile network (PLMN), etc. The embodiments of the disclosure are not limited thereto.

Embodiments of the disclosure provide a reporting method. The reporting method provided in embodiments of the disclosure is further described in detail below.

Figure 2:
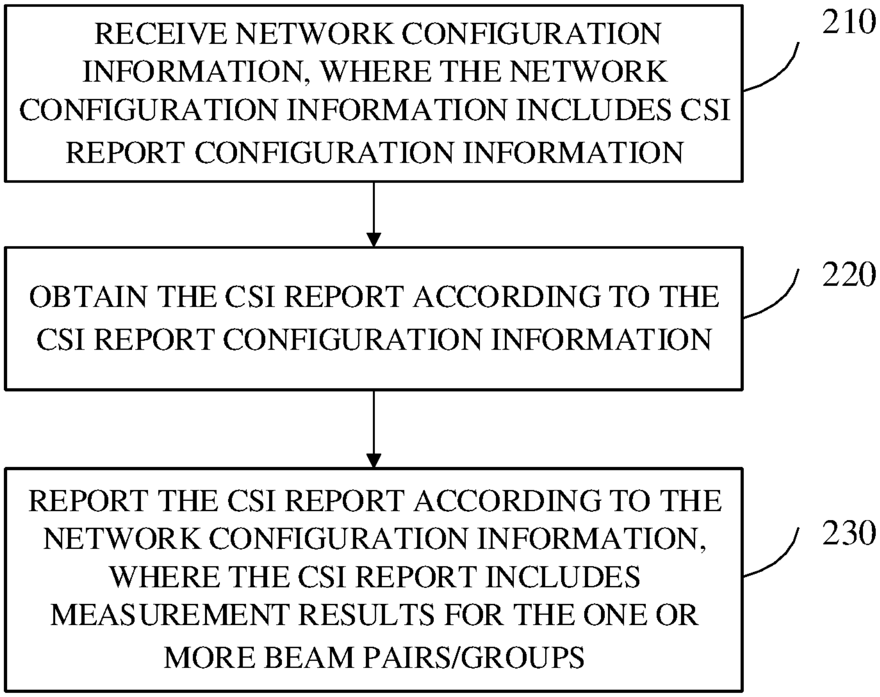
FIG. 2 is a schematic flow chart of a reporting method provided in embodiments of the disclosure.

Referring to FIG. 2, FIG. 2 is a schematic flow chart of a reporting method provided in embodiments of the disclosure. The reporting method includes operations 210 to 230 as follows. The method shown in FIG. 2 may be executed by a terminal device or a chip in the terminal device. When the terminal device executes the procedures shown in FIG. 2, the following operations may be included.

210, receive network configuration information, where the network configuration information includes CSI report configuration information.

The network configuration information may be sent by a network device.

Optionally, the network configuration information may also include one or more resource sets associated with a CSI report, each of the one or more resource sets is a resource set or a resource subset. The CSI report may be a CSI report that the terminal device will report to the network device.

Optionally, the CSI report configuration information may include one or more of the following information: beam pair/group-based beam report enable/disable information, where the beam pair/group-based beam report enable/disable information may be used to configure whether the CSI report is a beam pair/group-based beam report, if the CSI report is the beam pair/group-based beam report, i.e., the configuration information includes the beam pair/group-based enable information, it indicates that the terminal device can receive different beams included in one beam pair/group at the same time: a number N, where N indicates the number of the beam pairs/groups and N is a positive integer: and a number M, where M indicates the maximum number of the beam pairs/groups and M is a positive integer.

220, obtain the CSI report according to the CSI report configuration information.

Specifically, after receiving the network configuration information sent by the network device, the terminal device can measure one or more beams or reference signals according to the CSI report configuration information therein, to determine the CSI report.

Optionally, if the CSI report configuration information includes the number N, the number of beam pairs/groups that the terminal device needs to report is determined by the network device. The CSI report may include measurement results for the N beam pairs/groups, where the N beam pairs/groups include a first beam pair/group and a second beam pair/group, and the second beam pair/group is any of the N beam pairs/groups other than the first beam pair/group. For example, when N is 3, the N beam pairs/groups can include beam pair/group 1, beam pair/group 2, and beam pair/group3. If the first beam pair/group is beam pair/group 1, the second beam pair/group can be any one of beam pair/group 2 and beam pair/group3.

The first beam pair/group can be characterized by a first reference signal and a second reference signal.

A measurement result for the first beam pair/group may include one or more of the following information: a first reference signal received power (RSRP) value and a differential RSRP value of the second reference signal relative to the first RSRP value, where the first RSRP value corresponds to the first reference signal and the first RSRP value is an RSRP value for reference, that is, the first RSRP value can be used as a reference RSRP value and RSRP values of other reference signals are RSRP difference values with respect to the first RSRP value, and the RSRP value herein can be L1-RSRP value, which is the RSRP value of physical layer or layer 1: a first signal-to-interference-plus-noise ratio (SINR) value and a differential SINR value of the second reference signal relative to the first SINR value, where the first SINR value corresponds to the first reference signal and the first SINR value is a SINR value for reference, and where the SINR value herein can be L1-SINR value, that is, the SINR value of physical layer or layer 1: an index of a first resource set or an index of a second resource set, where the first resource set and the second resource set belong to one or more resource sets and the second resource set is any of the one or more resource sets other than the first resource set: and an index of a resource corresponding to the first reference signal and an index of a resource corresponding to the second reference signal.

Optionally, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

Optionally, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

It should be noted that the measurement result for the first beam pair/group may include one of the index of the first resource set and the index of the second resource set. In practice, whether the index of the first resource set or the index of the second resource set can be determined by the network device or the terminal device.

Furthermore, the second beam pair/group may be characterized by a third reference signal and a fourth reference signal. A measurement result for the second beam pair/group includes one or more of the following information: a differential RSRP value of the third reference signal relative to a first RSRP value and a differential RSRP value of the fourth reference signal relative to the first RSRP value: a differential SINR value of the third reference signal relative to a first SINR value, and a differential SINR value of the fourth reference signal relative to the first SINR value: and an index of a resource corresponding to the third reference signal and an index of a resource corresponding to the fourth reference signal.

The first reference signal and the third reference signal are from the same resource set: the second reference signal and the fourth reference signal are from the same resource set.

Optionally, the first reference signal and the second reference signal are from different resource sets; the third reference signal and the fourth reference signal are from different resource sets.

For example, assuming that N included in the CSI report configuration information is 2, and the CSI report is associated with two resource sets; resource set 1 {resource corresponding to resource index 10, resource corresponding to resource index 11, resource corresponding to resource index 12, resource corresponding to resource index 13}, and resource set 2 {resource corresponding to resource index 20, resource corresponding to resource index 21, resource corresponding to resource index 22, resource corresponding to resource index 23}. Through measurement, the terminal device obtains the CSI report. Two beams or reference signals included in beam pair/group 1 (corresponding to the first beam pair/group) contained in the CSI report are from the resource corresponding to resource index 10 in resource set 1 and the resource corresponding to resource index 22 in resource set 2, respectively. Two beams or reference signals included in beam pair/group 2 (corresponding to the second beam pair/group) contained in the CSI report are from the resource corresponding to resource index 11 in resource set 1 and the resource corresponding to resource index 23 in resource set 2, respectively. The value of L1-RSRP or L1-SINR corresponding to the resource corresponding to resource index 10 in resource set 1 can be the maximum value, the minimum value, or any value. The terminal device may regard the L1-RSRP or L1-SINR corresponding to the resource corresponding to resource index 10 in resource set 1 as the reference L1-RSRP or reference L1-SINR. Assume that beam pair/group 1 is characterized by reference signal 10 and reference signal 22, and beam pair/group 2 is characterized by reference signal 11 and reference signal 23. The CSI reported by the terminal device may include the following information: {index of resource set 1, resource index 10, RSRP value 1: resource index 22, differential RSRP value 1: resource index 11, differential RSRP value 2: resource index 23, differential RSRP value 3}.

(index of resource set 1, resource index 10, RSRP value 1: resource index 22, differential RSRP value 1) corresponds to the measurement result for beam pair/group 1: (resource index 11, differential RSRP value 2: resource index 23, differential RSRP value 3), corresponds to the measurement result for beam pair/group 2.

RSRP value 1 is a reference RSRP value, which is the RSRP value of reference signal 10 in beam pair/group 1. Differential RSRP value 1 is a differential RSRP value of the RSRP value of reference signal 22 in beam pair/group 1 with respect to RSRP value 1. Differential RSRP value 2 is a differential RSRP value of the RSRP value of reference signal 11 in beam pair/group 2 with respect to RSRP value 1, and so on.

Optionally, if the CSI report configuration information includes the number M, the number of beam pairs/groups to be reported by the terminal device is determined autonomously and dynamically by the terminal device. If the terminal device can autonomously and dynamically determine the number of beam pairs/groups to be reported, the CSI report can include two parts: the first part and the second part.

Optionally, the first part may include one or more of the following information: a number K, where K is less than or equal to M or T and K indicates the number of one or more beam pairs/groups contained in the CSI report, and K is a positive integer, and where the T can be derived from capability information of the terminal device and can represent the maximum number of beam pairs/groups contained in one CSI report supported by the terminal device, and T is a positive integer: and a measurement result for a third beam pair/group, where the third beam pair/group is any of the one or more beam pairs/groups.

The third beam pair/group may be characterized by a fifth reference signal and a sixth reference signal. The measurement result for the third beam pair/group may include one or more of the following information: a second RSRP value and a differential RSRP value of the sixth reference signal relative to the second RSRP value, where the second RSRP value corresponds to the fifth reference signal and the second RSRP value is an RSRP value for reference, that is, the second RSRP value can be used as a reference RSRP value and RSRP values of other reference signals are RSRP values are RSRP difference values with respect to the second RSRP value, and the RSRP value herein can be L1-RSRP value, which is the RSRP value of physical layer or layer 1: a second SINR value and a differential SINR value of the sixth reference signal relative to the second SINR value, where the second SINR value corresponds to the fifth reference signal and the second SINR value is a SINR value for reference, and where the SINR value herein can be L1-SINR value, that is, the SINR value of physical layer or layer 1: an index of a fourth resource set or an index of a fifth resource set, where the fourth resource set and the fifth resource set belong to one or more resource sets and the fifth resource set is any of the one or more resource sets other than the fourth resource set: and an index of a resource corresponding to the fifth reference signal and an index of a resource corresponding to the sixth reference signal.

Optionally, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

Optionally, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

It should be noted that the measurement result for the third beam pair/group may include one of the index of the fourth resource set and the index of the fifth resource set. In practice, whether the index of the fourth resource set or the index of the fifth resource set may be determined by the network device or the terminal device.

Optionally, the second part includes: one or more measurement results for a fourth beam pair/group, where the fourth beam pair/group is any of the one or more beam pairs/groups other than a third beam pair/group.

Optionally, the fourth beam pair/group may be characterized by a seventh reference signal and an eighth reference signal. The measurement result for the fourth beam pair/group may include one or more of the following information: a differential RSRP value of the seventh reference signal relative to a second RSRP value, and a differential RSRP value of the eighth reference signal relative to the second RSRP value: a differential SINR value of the seventh reference signal relative to a second SINR value, and a differential SINR value of the eighth reference signal relative to the second SINR value: and an index of a resource corresponding to the seventh reference signal and an index of a resource corresponding to the eighth reference signal.

The fifth reference signal and the seventh reference signal are from the same resource set; the sixth reference signal and the eighth reference signal are from the same resource set.

Optionally, the fifth reference signal and the sixth reference signal are from different resource sets; the seventh reference signal and the eighth reference signal are from different resource sets.

For example, assuming that M included in the CSI report configuration information is 4, K determined by the terminal device is 2, and the CSI report is associated with two resource sets: resource set 1 {resource corresponding to resource index 10, resource corresponding to resource index 11, resource corresponding to resource index 12, resource corresponding to resource index 13}, and resource set 2 {resource corresponding to resource index 20, resource corresponding to resource index 21, resource corresponding to resource index 22, resource corresponding to resource index 23}. Through measurement, the terminal obtains the CSI report. Two beams or reference signals included in beam pair/group 1 (corresponding to the first beam pair/group) contained in the CSI report are from the resource corresponding to resource index 10 in resource set 1 and the resource corresponding to resource index 22 in resource set 2, respectively. Two beams or reference signals included in beam pair/group 2 (corresponding to the second beam pair/group) contained in the CSI report are from the resource corresponding to resource index 11 in resource set 1 and the resource corresponding to resource index 23 in resource set 2, respectively. The value of L1-RSRP or L1-SINR corresponding to the resource corresponding to resource index 10 in resource set 1 can be the maximum value, the minimum value, or any value. The terminal device may regard the L1-RSRP or L1-SINR corresponding to the resource corresponding to resource index 10 in resource set 1 as the reference L1-RSRP or reference L1-SINR. Assume that beam pair/group 1 is characterized by reference signal 10 and reference signal 22, and beam pair/group 2 is characterized by reference signal 11 and reference signal 23. The CSI reported by the terminal device may include the following information: the first part and the second part.

The first part: number K, index of resource set 1, resource index 10, RSRP value 1: resource index 22, differential RSRP value 1.

The second part: resource index 11, differential RSRP value 2: resource index 23, differential RSRP value 3.

(index of resource set 1, resource index 10. RSRP value 1: resource index 22, differential RSRP value 1) corresponds to the measurement result for beam pair/group 1: (resource index 11, differential RSRP value 2: resource index 23, differential RSRP value 3), corresponds to the measurement result for beam pair/group 2.

RSRP value 1 is a reference RSRP value. Differential RSRP value 1 is a differential RSRP value of the RSRP value of reference signal 22 in beam pair/group 1 with respect to RSRP value 1. Differential RSRP value 2 is a differential RSRP value of the RSRP value of reference signal 11 in beam pair/group 2 with respect to RSRP value 1, and so on.

230, report the CSI report according to the network configuration information, where the CSI report includes measurement results for the one or more beam pairs/groups.

Through the above operations, after the terminal device determines the CSI report, it can report the CSI report to the network device.

According to the embodiments of the disclosure, after receiving the network configuration information sent by the network device, the terminal device obtains the CSI report according to the CSI report configuration information therein and reports the obtained CSI report to the network device, where the CSI report can include the measurement results for the one or more beam pairs/groups. In the scheme of the disclosure, the CSI report can include the measurement results for the one or more beam pairs/groups and one CSI report can be associated with one or more resource sets. Compared with the related art, one CSI report can include measurement results of more beam pairs/groups and be associated with more resource sets. With the method, it is beneficial to report the measurement results for the one or more beam pairs/groups. With the method, it is also beneficial to further improve the beam management mechanism of the multi-TRP transmission and to effectively support the multi-TRP transmission. With the method, the terminal can be supported to dynamically decide the number of beam pairs/groups contained in one CSI report, thereby realizing understanding in consistency of the terminal and the network, effectively reducing the resource overhead and improving the network performance.

Figure 3:
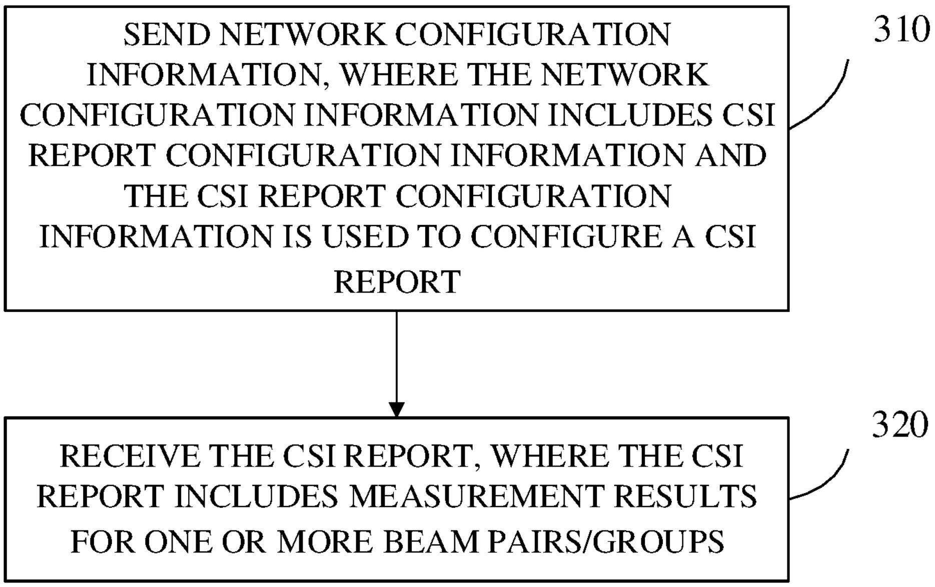
FIG. 3 is a schematic flow chart of a configuration method provided in embodiments of the disclosure.

Referring to FIG. 3, FIG. 3 is a schematic flow chart of a configuration method provided in embodiments of the disclosure. The configuration method includes operations 310 to 320 as follows. The method shown in FIG. 3 may be executed by a network device or a chip in the network device. When the network device executes the procedures shown in FIG. 3, the following operations may be included.

310, send network configuration information, where the network configuration information includes CSI report configuration information and the CSI report configuration information is used to configure a CSI report.

The network configuration information may be sent to a terminal device.

Optionally, the network configuration information may also include one or more resource sets associated with the CSI report, each of the one or more resource sets is a resource set or a resource subset. The CSI report may be a CSI report that the terminal device will report to the network device.

Optionally, the CSI report configuration information may include one or more of the following information: beam pair/group-based beam report enable/disable information, where the beam pair/group-based beam report enable/disable information may be used to configure whether the CSI report is a beam pair/group-based beam report, if the CSI report is the beam pair/group-based beam report, i.e., the configuration information includes the beam pair/group-based enable information, it indicates that the terminal device can receive different beams included in one beam pair/group at the same time: a number N, where N indicates the number of the beam pairs/groups and N is a positive integer: and a number M, where M indicates the maximum number of the beam pairs/groups and M is a positive integer.

The CSI report configuration information may indicate the terminal device to: measure the received reference signal(s) according to the CSI report configuration information, to determine the CSI report.

320, receive the CSI report, where the CSI report includes measurement results for one or more beam pairs/groups.

Optionally, if the CSI report configuration information includes the number N, the number of beam pairs/groups that the terminal device needs to report is determined by the network device. The CSI report may include measurement results for the N beam pairs/groups, where the N beam pairs/groups include a first beam pair/group and a second beam pair/group, and the second beam pair/group is any of the N beam pairs/groups other than the first beam pair/group.

The first beam pair/group can be characterized by a first reference signal and a second reference signal.

A measurement result for the first beam pair/group may include one or more of the following information: a first RSRP value and a differential RSRP value of the second reference signal relative to the first RSRP value, where the first RSRP value corresponds to the first reference signal and the first RSRP value is an RSRP value for reference, that is, the first RSRP value can be used as a reference RSRP value and RSRP values of other reference signals are RSRP difference values with respect to the first RSRP value, and the RSRP value herein can be L1-RSRP value, which is the RSRP value of the physical layer of the terminal device: a first SINR value and a differential SINR value of the second reference signal relative to the first SINR value, where the first SINR value corresponds to the first reference signal and the first SINR value is a SINR value for reference, and where the SINR value herein can be L1-SINR value, that is, the SINR value of the physical layer of the terminal device: an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

Optionally, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

Optionally, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

It should be noted that the measurement result for the first beam pair/group may include one of the index of the first resource set and the index of the second resource set. In practice, whether the index of the first resource set or the index of the second resource set can be determined by the network device or the terminal device.

Furthermore, the second beam pair/group may be characterized by a third reference signal and a fourth reference signal. A measurement result for the second beam pair/group includes one or more of the following information: a differential RSRP value of the third reference signal relative to a first RSRP value and a differential RSRP value of the fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

The first reference signal and the third reference signal are from the same resource set: the second reference signal and the fourth reference signal are from the same resource set.

Optionally, the first reference signal and the second reference signal are from different resource sets; the third reference signal and the fourth reference signal are from different resource sets.

Optionally, if the CSI report configuration information includes the number M, the network device can configure the terminal device to autonomously and dynamically determine the number of beam pairs/groups to be reported. The CSI report can include two parts: a first part and a second part.

Optionally, the first part may include one or more of the following information: a number K, where K is less than or equal to M or T and K indicates the number of one or more beam pairs/groups contained in the CSI report, and K is a positive integer, and where the T can be derived from capability information of the terminal device and can represent the maximum number of beam pairs/groups contained in one CSI report supported by the terminal device, and T is a positive integer; and a measurement result for a third beam pair/group, where the third beam pair/group is any of the one or more beam pairs/groups.

The third beam pair/group may be characterized by a fifth reference signal and a sixth reference signal. The measurement result for the third beam pair/group may include one or more of the following information: a second RSRP value and a differential RSRP value of the sixth reference signal relative to the second RSRP value, where the second RSRP value corresponds to the fifth reference signal and the second RSRP value is an RSRP value for reference, that is, the second RSRP value can be used as a reference RSRP value and RSRP values of other reference signals are RSRP values are RSRP difference values with respect to the second RSRP value, and the RSRP value herein can be L1-RSRP value, which is the RSRP value of physical layer or layer 1; a second SINR value and a differential SINR value of the sixth reference signal relative to the second SINR value, where the second SINR value corresponds to the fifth reference signal and the second SINR value is a SINR value for reference, and where the SINR value herein can be L1-SINR value, that is, the SINR value of physical layer or layer 1; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

Optionally, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

Optionally, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

It should be noted that, the measurement result for the third beam pair/group may include one of the index of the fourth resource set and the index of the fifth resource set. In practice, whether the index of the fourth resource set or the index of the fifth resource set may be determined by the network device or the terminal device.

Optionally, the second part includes: one or more measurement results for a fourth beam pair/group, where the fourth beam pair/group is any of the one or more beam pairs/groups other than a third beam pair/group.

Optionally, the fourth beam pair/group may be characterized by a seventh reference signal and an eighth reference signal. The measurement result for the fourth beam pair/group may include one or more of the following information: a differential RSRP value of the seventh reference signal relative to a second RSRP value, and a differential RSRP value of the eighth reference signal relative to the second RSRP value; a differential SINR value of the seventh reference signal relative to a second SINR value, and a differential SINR value of the eighth reference signal relative to the second SINR value: and an index of a resource corresponding to the seventh reference signal and an index of a resource corresponding to the eighth reference signal.

The fifth reference signal and the seventh reference signal are from the same resource set; the sixth reference signal and the eighth reference signal are from the same resource set.

Optionally, the fifth reference signal and the sixth reference signal are from different resource sets; the seventh reference signal and the eighth reference signal are from different resource sets.

According to the embodiments of the disclosure, the network device can send the network configuration information to the terminal device, where the CSI report configuration information included in the network configuration information can indicate the terminal device to obtain the CSI report. The terminal device can obtain the CSI report by detecting one or more reference signals, where the CSI report can include the measurement results for the one or more beam pairs/groups. In the scheme of the disclosure, the CSI report can include the one or more beam pairs/groups and one CSI report can be associated with one or more resource sets. Compared with the related art, one CSI report can include measurement results of more beam pairs/groups and be associated with more resource sets. With the method, it is beneficial to report the measurement results for the one or more beam pairs/groups. With the method, it is also beneficial to further improve the beam management mechanism of the multi-TRP transmission and to effectively support the multi-TRP transmission. With the method, the terminal can be supported to dynamically decide the number of beam pairs/groups contained in one CSI report, thereby realizing understanding in consistency of the terminal and the network, effectively reducing the resource overhead and improving the network performance.

Figure 4:
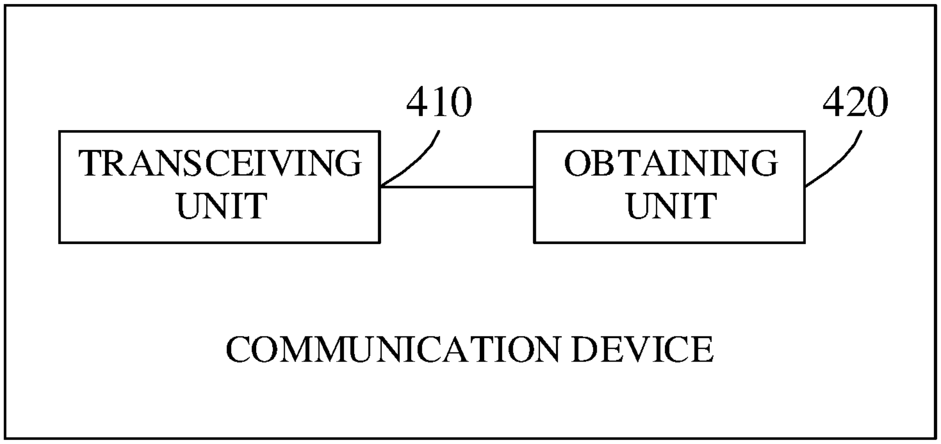
FIG. 4 is a schematic diagram of units of a communication device provided in embodiments of the disclosure.

Referring to FIG. 4, FIG. 4 is a schematic diagram of units of a communication device provided in embodiments of the disclosure. The communication device shown in FIG. 4 may be used to perform some or all of the functions in the method embodiments described above in FIG. 2 and FIG. 3. The device may be a terminal device, a device in the terminal device, or a device in use with a second network element. The device may also be a network device, may be a device in the network device, or may be a device in use with the network device.

The logical structure of the device may include a transceiving unit 410 and an obtaining unit 420.

When the device is applied to the terminal device, the transceiving unit 410 is configured to receive network configuration information, where the network configuration information includes CSI report configuration information, the obtaining unit 420 is configured to obtain a CSI report according to the CSI report configuration information, and the transceiving unit 410 is further configured to report the CSI report according to the network configuration information, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference: a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set: and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer; and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

When the device is applied to the network device, the transceiving unit 410 is configured to: send network configuration information, where the network configuration information includes CSI report configuration information and the CSI report configuration information is used to configure a CSI report; and receive the CSI report, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer: and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

Figure 5:
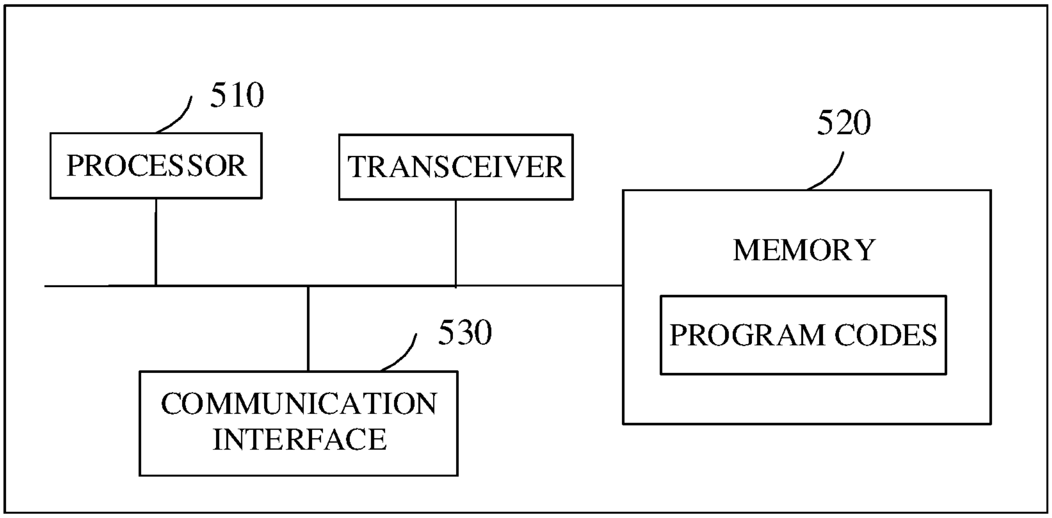
FIG. 5 is a simplified schematic diagram of a physical structure of a communication equipment provided in embodiments of the disclosure.

Referring to FIG. 5, FIG. 5 is a simplified schematic diagram of a physical structure of a communication equipment provided in embodiments of the disclosure. The communication equipment includes a processor 510, a memory 520, a transceiver, and a communication interface 530. The processor 510, the memory 520, the transceiver, and the communication interface 530 are connected through one or more communication buses. The communication equipment may be a chip, a chip module, or the like.

The processor 510 is configured to support the communication equipment to perform corresponding functions of the methods in above FIG. 2 and FIG. 3. It should be understood that in embodiments of the disclosure, the processor 510 may be a central processing unit (CPU), which may also be other general purpose processors, digital signal processors (DSP), application specific integrated circuits (ASIC), field programmable gate arrays (FPGA), or other programmable logic devices, discrete gate or transistor logic devices, discrete hardware components, etc. The general purpose processor may be a microprocessor or the processor may be any conventional processor or the like.

The memory 520 is used for storing program codes/instructions and the like. In embodiments of the disclosure, the memory 520 may be transitory memory or non-transitory memory or may include both transitory and non-transitory memory. The non-transitory memory can be read-only memory (ROM), programmable ROM (PROM), erasable programmable ROM (EPROM), electrically erasable programmable ROM (EEPROM), or flash memory. The transitory memory may be random access memory (RAM), which serves as an external cache. By way of illustration rather than limitation, many forms of random access memory (RAM) are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct rambus RAM (DR RAM).

The communication interface 530 is used to transmit and receive data, information, messages, or the like and may also be described as a transceiver, a transceiving circuit, or the like.

In embodiments of the disclosure, when the communication equipment is a terminal device, the processor 510 invokes the program codes stored in the memory 520 to control the transceiver and the communication interface 530 to receive network configuration information, where the network configuration information includes CSI report configuration information, to obtain a CSI report according to the CSI report configuration information, and to control the transceiver and the communication interface 530 to report the CSI report according to the network configuration information, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer; and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

In embodiments of the disclosure, when the communication equipment is a network device, the processor 510 invokes the program codes stored in the memory 520 to control the communication interface 530 to: send network configuration information, where the network configuration information includes CSI report configuration information and the CSI report configuration information is used to configure a CSI report; and receive the CSI report, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer; and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

Embodiments of the disclosure further provide a chip. The chip can be included in a chip module.

When the chip is applied to a terminal device, the chip is configured to control to receive network configuration information, where the network configuration information includes CSI report configuration information, the chip is further configured to obtain a CSI report according to the CSI report configuration information, and the chip is further configured to control to report the CSI report according to the network configuration information, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer: and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

When the chip is applied to a network device, the chip is configured to control to: send network configuration information, where the network configuration information includes CSI report configuration information and the CSI report configuration information is used to configure a CSI report; and receive the CSI report, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer: and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group. The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

Figure 6:
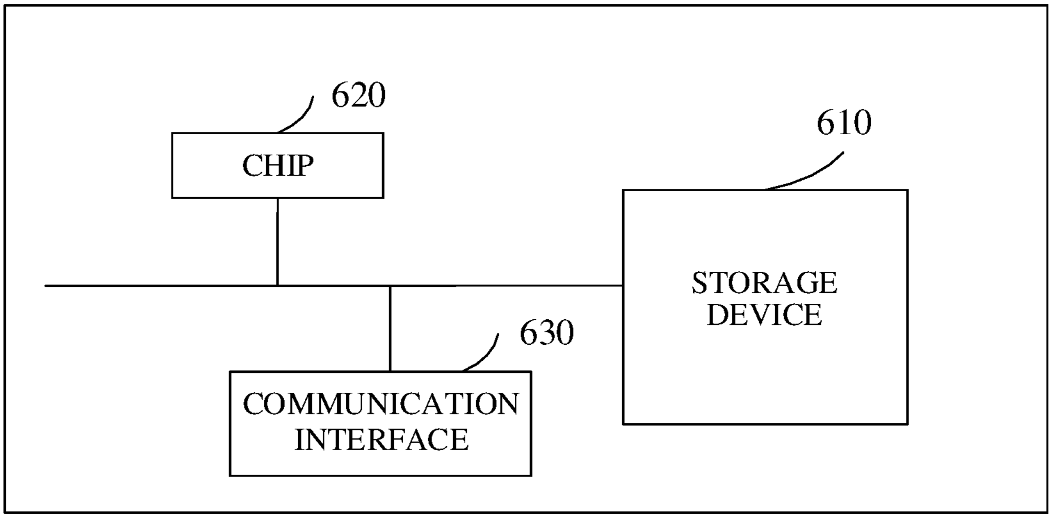
FIG. 6 is a simplified schematic diagram of a chip module provided in embodiments of the disclosure.

Referring to FIG. 6, FIG. 6 is a simplified schematic diagram of a chip module provided in embodiments of the disclosure. The chip module includes a storage device 610, a chip 620, and a communication interface 630.

When the chip module is applied to a terminal device, the chip 620 is configured to control the communication interface 630 to receive network configuration information, where the network configuration information includes CSI report configuration information, the chip 620 is further configured to obtain a CSI report according to the CSI report configuration information, and the chip 620 is further configured to control the communication interface 630 to report the CSI report according to the network configuration information, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer; and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

When the chip module is applied to a network device, the chip 620 is configured to control the communication interface 630 to: send network configuration information, where the network configuration information includes CSI report configuration information and the CSI report configuration information is used to configure a CSI report: and receive the CSI report, where the CSI report includes measurement results for one or more beam pairs/groups.

In a possible implementation, the network configuration information further includes one or more resource sets associated with the CSI report and each of the one or more resource sets is a resource set or a resource subset.

In a possible implementation, the CSI report configuration information includes one or more of the following information: beam pair/group-based beam report enable/disable information; a number N, where N indicates the number of the beam pairs/groups and N is a positive integer; and a number M, where M indicates the maximum number of the beam pairs/groups and M is a positive integer.

In a possible implementation, the CSI report includes measurement results for the N beam pairs/groups, where the N beam pairs/groups include at least one of a first beam pair/group or a second beam pair/group, and the second beam pair/group is any of the N beam pairs/groups other than the first beam pair/group.

In a possible implementation, a measurement result for the first beam pair/group includes one or more of the following information: a first RSRP value and a differential RSRP value of a second reference signal relative to the first RSRP value, where the first RSRP value corresponds to a first reference signal and the first RSRP value is an RSRP value for reference; a first SINR value and a differential SINR value of the second reference signal relative to the first SINR value, where the first SINR value corresponds to the first reference signal and the first SINR value is a SINR value for reference; an index of a first resource set or an index of a second resource set, where the first resource set and the second resource set belong to one or more resource sets and the second resource set is any of the one or more resource sets other than the first resource set; and an index of a resource corresponding to the first reference signal and an index of a resource corresponding to the second reference signal.

In a possible implementation, if the measurement result for the first beam pair/group includes the index of the first resource set, the resource corresponding to the first reference signal belongs to the first resource set and the resource corresponding to the second reference signal belongs to the second resource set, where the index of the first resource set indicates that the first reference signal belongs to the first resource set.

In a possible implementation, if the measurement result for the first beam pair/group includes the index of the second resource set, the resource corresponding to the first reference signal belongs to the second resource set and the resource corresponding to the second reference signal belongs to a third resource set, where the index of the second resource set indicates that the first reference signal belongs to the second resource set, and the third resource set is any of the one or more resource sets other than the second resource set.

In a possible implementation, a measurement result for the second beam pair/group includes one or more of the following information: a differential RSRP value of a third reference signal relative to a first RSRP value and a differential RSRP value of a fourth reference signal relative to the first RSRP value; a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

In a possible implementation, a first reference signal and the third reference signal are from the same resource set; and/or a second reference signal and the fourth reference signal are from the same resource set.

In a possible implementation, the first reference signal and the second reference signal are from different resource sets; and/or the third reference signal and the fourth reference signal are from different resource sets.

In a possible implementation, the CSI report includes a first part and a second part.

In a possible implementation, the first part includes one or more of the following information: a number K, where K is less than or equal to M and K indicates the number of the one or more beam pairs/groups contained in the CSI report, and K is a positive integer; and a measurement result for a third beam pair/group, where the third beam pair/group is any of the one or more beam pairs/groups.

In a possible implementation, the measurement result for the third beam pair/group includes one or more of the following information: a second RSRP value and a differential RSRP value of a sixth reference signal relative to the second RSRP value, where the second RSRP value corresponds to a fifth reference signal and the second RSRP value is an RSRP value for reference; a second SINR value and a differential SINR value of the sixth reference signal relative to the second SINR value, where the second SINR value corresponds to the fifth reference signal and the second SINR value is a SINR value for reference; an index of a fourth resource set or an index of a fifth resource set, where the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

In a possible implementation, if the measurement result for the third beam pair/group includes the index of the fourth resource set, the resource corresponding to the fifth reference signal belongs to the fourth resource set and the resource corresponding to the sixth reference signal belongs to the fifth resource set, where the index of the fourth resource set indicates that the fifth reference signal belongs to the fourth resource set.

In a possible implementation, if the measurement result for the third beam pair/group includes the index of the fifth resource set, the resource corresponding to the fifth reference signal belongs to the fifth resource set and the resource corresponding to the sixth reference signal belongs to a sixth resource set, where the index of the fifth resource set indicates that the fifth reference signal belongs to the fifth resource set, and the sixth resource set is any of the one or more resource sets other than the fifth resource set.

In a possible implementation, the second part includes: one or more measurement results for a fourth beam pair/group, where the fourth beam pair/group is any of the one or more beam pairs/groups other than a third beam pair/group.

The measurement result for the fourth beam pair/group includes one or more of the following information: a differential RSRP value of a seventh reference signal relative to a second RSRP value, and a differential RSRP value of an eighth reference signal relative to the second RSRP value; a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

In a possible implementation, a fifth reference signal and the seventh reference signal are from the same resource set; and/or a sixth reference signal and the eighth reference signal are from the same resource set.

In a possible implementation, the fifth reference signal and the sixth reference signal are from different resource sets; and/or the seventh reference signal and the eighth reference signal are from different resource sets.

It should be noted that, in the above embodiments, the description of each embodiment has its own emphasis and for parts not described in detail in a certain embodiment reference can be made to related descriptions of other embodiments.

The operations in the method of the embodiments of the disclosure can be adjusted in order, combined, and deleted according to actual needs.

The units in the processing equipment of the embodiments of the disclosure can be combined, divided, and deleted according to actual needs.

In the above embodiments, they may be implemented in whole or in part by software, hardware, firmware, or any combination thereof. When implemented in software, they can be implemented in whole or in part in the form of a computer program product. The computer program product includes one or more computer instructions. When computer program instructions are loaded and executed on a computer, the flow or function according to the embodiments of the disclosure is generated in whole or in part. The computer may be a general purpose computer, a special purpose computer, a computer network, or other programmable device. The computer instructions may be stored in the computer-readable storage medium or transmitted from one computer-readable storage medium to another. For example, the computer instructions may be transmitted from one Web site, computer, server, or data center via wired (e.g. coaxial cable, optical fiber, digital subscriber line) way or wireless (e.g. infrared, wireless, microwave, etc.) way to another Web site, computer, server, or data center. The computer-readable storage medium may be any available medium that the computer can access or a data storage device such as a server or data center containing one or more available media. The available media may be magnetic media (e.g. floppy disk, storage disk, magnetic tape), optical media (e.g. DVD), or semiconductor media (e.g. solid state disk (SSD)), etc.

Finally, it should be noted that the above embodiments are only used to illustrate the technical scheme of the disclosure, not to limit the disclosure. Although the disclosure has been described in detail with reference to the foregoing embodiments, it should be understood by those of ordinary skill in the art that the technical scheme described in the foregoing embodiments can still be modified or some or all of the technical features thereof can be equivalently substituted. These modifications or substitutions do not depart the essence of the corresponding technical scheme from the scope of the technical scheme of the embodiments of the disclosure.

What is claimed is:

1. A reporting method, comprising:

receiving network configuration information, the network configuration information comprising channel state information (CSI) report configuration information;

obtaining a CSI report according to the CSI report configuration information; and reporting the CSI report according to the network configuration information, the CSI report comprising measurement results for one or more beam pairs/groups;

wherein the CSI report configuration information comprises one or more of the following information:

beam pair/group-based beam report enable/disable information;

a number N, wherein N indicates the number of the beam pairs/groups and N is a positive integer; and a number M, wherein M indicates the maximum number of the beam pairs/groups and M is a positive integer;

wherein the CSI report comprises measurement results for the N beam pairs/groups, wherein the N beam pairs/groups comprise at least one of a first beam pair/group or a second beam pair/group, and the second beam pair/group is any of the N beam pairs/groups other than the first beam pair/group;

wherein a measurement result for the first beam pair/group comprises one or more of the following information;

a first reference signal received power (RSRP) value and a differential RSRP value of a second reference signal relative to the first RSRP value, wherein the first RSRP value corresponds to a first reference signal and the first RSRP value is an RSRP value for reference;

a first signal-to-interference-plus-noise ratio (SINR) value and a differential SINR value of the second reference signal relative to the first SINR value, wherein the first SINR value corresponds to the first reference signal and the first SINR value is a SINR value for reference;

an index of a first resource set or an index of a second resource set, wherein the first resource set and the second resource set belong to one or more resource sets, and the second resource set is any of the one or more resource sets other than the first resource set; and an index of a resource corresponding to the first reference signal and an index of a resource corresponding to the second reference signal.

2. The method of claim 1, wherein the network configuration information further comprises one or more resource sets associated with the CSI report and each of the one or more resource sets is a resource set or a resource subset.

3. The method of claim 1, wherein if the measurement result for the first beam pair/group comprises the index of the first resource set, the resource corresponding to the first reference signal belongs to the first resource set and the resource corresponding to the second reference signal belongs to the second resource set, wherein the index of the first resource set indicates that the first reference signal belongs to the first resource set.

4. The method of claim 1, wherein if the measurement result for the first beam pair/group comprises the index of the second resource set, the resource corresponding to the first reference signal belongs to the second resource set and the resource corresponding to the second reference signal belongs to a third resource set, wherein the index of the second resource set indicates that the first reference signal belongs to the second resource set, and the third resource set is any of the one or more resource sets other than the second resource set.

5. The method of claim 1, wherein a measurement result for the second beam pair/group comprises one or more of the following information:

a differential RSRP value of a third reference signal relative to a first RSRP value and a differential RSRP value of a fourth reference signal relative to the first RSRP value;

a differential SINR value of the third reference signal relative to a first SINR value, and a differential SINR value of the fourth reference signal relative to the first SINR value; and an index of a resource corresponding to the third reference signal and an index of a resource corresponding to the fourth reference signal.

6. The method of claim 5, wherein at least one of:

a first reference signal and the third reference signal are from the same resource set; or a second reference signal and the fourth reference signal are from the same resource set.

7. The method of claim 6, wherein at least one of:

the first reference signal and the second reference signal are from different resource sets; or the third reference signal and the fourth reference signal are from different resource sets.

8. The method of claim 1, wherein the CSI report comprises a first part and a second part.

9. The method of claim 8, wherein the first part comprises one or more of the following information:

a number K, wherein K is less than or equal to M and K indicates the number of the one or more beam pairs/groups contained in the CSI report, and K is a positive integer; and a measurement result for a third beam pair/group, wherein the third beam pair/group is any of the one or more beam pairs/groups.

10. The method of claim 9, wherein the measurement result for the third beam pair/group comprises one or more of the following information:

a second RSRP value and a differential RSRP value of a sixth reference signal relative to the second RSRP value, wherein the second RSRP value corresponds to a fifth reference signal and the second RSRP value is an RSRP value for reference;

a second SINR value and a differential SINR value of the sixth reference signal relative to the second SINR value, wherein the second SINR value corresponds to the fifth reference signal and the second SINR value is a SINR value for reference;

an index of a fourth resource set or an index of a fifth resource set, wherein the fourth resource set and the fifth resource set belong to one or more resource sets and the fifth resource set is any of the one or more resource sets other than the fourth resource set; and an index of a resource corresponding to the fifth reference signal and an index of a resource corresponding to the sixth reference signal.

11. The method of claim 10, wherein if the measurement result for the third beam pair/group comprises the index of the fourth resource set, the resource corresponding to the fifth reference signal belongs to the fourth resource set and the resource corresponding to the sixth reference signal belongs to the fifth resource set, wherein the index of the fourth resource set indicates that the fifth reference signal belongs to the fourth resource set.

12. The method of claim 10, wherein if the measurement result for the third beam pair/group comprises the index of the fifth resource set, the resource corresponding to the fifth reference signal belongs to the fifth resource set and the resource corresponding to the sixth reference signal belongs to a sixth resource set, wherein the index of the fifth resource set indicates that the fifth reference signal belongs to the fifth resource set, and the sixth resource set is any of the one or more resource sets other than the fifth resource set.

13. The method of claim 8, wherein the second part comprises:

one or more measurement results for a fourth beam pair/group, wherein the fourth beam pair/group is any of the one or more beam pairs/groups other than a third beam pair/group.

14. The method of claim 13, wherein the measurement result for the fourth beam pair/group comprises one or more of the following information:

a differential RSRP value of a seventh reference signal relative to a second RSRP value, and a differential RSRP value of an eighth reference signal relative to the second RSRP value;

a differential SINR value of the seventh reference signal relative to a second SINR value, and a differential SINR value of the eighth reference signal relative to the second SINR value; and an index of a resource corresponding to the seventh reference signal and an index of a resource corresponding to the eighth reference signal.

15. The method of claim 14, wherein at least one of:

a fifth reference signal and the seventh reference signal are from the same resource set; or a sixth reference signal and the eighth reference signal are from the same resource set.

16. A communication equipment, comprising:

a transceiver;

a memory storing program instructions; and a processor coupled with the memory and the transceiver and configured to invoke the program instructions to:

cause the transceiver to receive network configuration information, the network configuration information comprising channel state information (CSI) report configuration information;

obtain a CSI report according to the CSI report configuration information; and cause the transceiver to report the CSI report according to the network configuration information, the CSI report comprising measurement results for one or more beam pairs/groups;

wherein the CSI report configuration information comprises one or more of the following information:

beam pair/group-based beam report enable/disable information;

a number N, wherein N indicates the number of the beam pairs/groups and N is a positive integer; and a number M, wherein M indicates the maximum number of the beam pairs/groups and M is a positive integer;

wherein the CSI report comprises measurement results for the N beam pairs/groups, wherein the N beam pairs/groups comprise at least one of a first beam pair/group or a second beam pair/group, and the second beam pair/group is any of the N beam pairs/groups other than the first beam pair/group;

wherein a measurement result for the first beam pair/group comprises one or more of the following information;

a first reference signal received power (RSRP) value and a differential RSRP value of a second reference signal relative to the first RSRP value, wherein the first RSRP value corresponds to a first reference signal and the first RSRP value is an RSRP value for reference;

a first signal-to-interference-plus-noise ratio (SINR) value and a differential SINR value of the second reference signal relative to the first SINR value, wherein the first SINR value corresponds to the first reference signal and the first SINR value is a SINR value for reference;

an index of a first resource set or an index of a second resource set, wherein the first resource set and the second resource set belong to one or more resource sets, and the second resource set is any of the one or more resource sets other than the first resource set; and an index of a resource corresponding to the first reference signal and an index of a resource corresponding to the second reference signal.

17. A non-transitory computer-readable storage medium, storing one or more instructions adapted to be loaded by a processor and to:

receive network configuration information, the network configuration information comprising channel state information (CSI) report configuration information;

obtain a CSI report according to the CSI report configuration information; and report the CSI report according to the network configuration information, the CSI report comprising measurement results for one or more beam pairs/groups;

wherein the CSI report configuration information comprises one or more of the following information:

beam pair/group-based beam report enable/disable information;

a number N, wherein N indicates the number of the beam pairs/groups and N is a positive integer; and a number M, wherein M indicates the maximum number of the beam pairs/groups and M is a positive integer;

wherein the CSI report comprises measurement results for the N beam pairs/groups, wherein the N beam pairs/groups comprise at least one of a first beam pair/group or a second beam pair/group, and the second beam pair/group is any of the N beam pairs/groups other than the first beam pair/group;

wherein a measurement result for the first beam pair/group comprises one or more of the following information:

a first reference signal received power (RSRP) value and a differential RSRP value of a second reference signal relative to the first RSRP value, wherein the first RSRP value corresponds to a first reference signal and the first RSRP value is an RSRP value for reference;

a first signal-to-interference-plus-noise ratio (SINR) value and a differential SINR value of the second reference signal relative to the first SINR value, wherein the first SINR value corresponds to the first reference signal and the first SINR value is a SINR value for reference;

an index of a first resource set or an index of a second resource set, wherein the first resource set and the second resource set belong to one or more resource sets, and the second resource set is any of the one or more resource sets other than the first resource set; and an index of a resource corresponding to the first reference signal and an index of a resource corresponding to the second reference signal.

* * * * *